United States Patent [19]

Lynch et al.

[11] Patent Number: 4,550,225

[45] Date of Patent: Oct. 29, 1985

[54] AC SIGNAL-ACTIVATED SWITCHING APPARATUS

[75] Inventors: Daniel Lynch, Jackson; Steven B. Perry, Highlands, both of N.J.

[73] Assignee: Keptel, Inc., Ocean, N.J.

[21] Appl. No.: 547,170

[22] Filed: Oct. 31, 1983

[51] Int. Cl.[4] .................... H04B 3/46

[52] U.S. Cl. .................... 179/81 R; 179/175.3 R

[58] Field of Search ....... 179/81 R, 175.3 R, 175.3 F; 328/138

[56] References Cited

U.S. PATENT DOCUMENTS

| | | | |
|---|---|---|---|
| Re. 29,499 | 12/1977 | Spencer | 179/175.3 |
| 3,636,280 | 1/1972 | Wetzel | 179/175.3 |
| 3,725,589 | 4/1973 | Golden | 179/6 |
| 3,725,613 | 4/1973 | Allen et al. | 179/175.3 |
| 3,739,107 | 6/1973 | Spencer | 179/175.3 |
| 3,766,336 | 10/1973 | Wikholm | 179/175.3 |
| 3,773,986 | 11/1973 | Tremblay | 179/175.3 |
| 3,814,870 | 6/1974 | Miller | 179/175.2 |
| 3,829,616 | 8/1974 | Blouch | 179/2 |
| 3,843,848 | 10/1974 | Cox | 179/175.3 |
| 3,849,764 | 11/1974 | Wang et al. | 340/171 |
| 3,852,537 | 12/1974 | Vincent | 179/17 |
| 3,860,769 | 1/1975 | Pachynski, Jr. | 179/175.3 |
| 3,867,588 | 2/1975 | Pickens et al. | 179/175.3 |
| 3,902,016 | 8/1975 | Blouch | 179/2 |
| 3,912,882 | 10/1975 | Beerbaum | 179/175.3 |
| 3,919,487 | 11/1975 | Gabrielson | 179/17 |
| 3,920,935 | 11/1975 | Vierling et al. | 179/175.3 |
| 3,922,508 | 11/1975 | Brady | 179/175.3 |
| 3,943,305 | 3/1976 | Hagedorn | 179/175.3 |
| 3,947,753 | 3/1976 | Gushima et al. | 323/21 |
| 4,004,236 | 1/1977 | Cardon et al. | 328/138 |
| 4,024,414 | 5/1977 | Gurry | 328/138 X |
| 4,041,255 | 8/1977 | Cambridge et al. | 179/175.3 |
| 4,054,759 | 10/1977 | McGrath et al. | 179/175.3 |
| 4,068,104 | 1/1978 | Werth et al. | 179/175.3 |
| 4,070,554 | 1/1978 | Rule et al. | 179/175.3 |
| 4,086,448 | 4/1978 | Anglikowski | 179/175.3 |
| 4,112,414 | 9/1978 | Iscol et al. | 340/146.1 |
| 4,126,771 | 11/1978 | Proctor et al. | 232/175.3 |
| 4,143,250 | 3/1979 | Simokat | 179/175.3 |
| 4,169,220 | 9/1979 | Fields | 179/175.3 |
| 4,197,435 | 4/1980 | Jackson et al. | 179/175.3 |
| 4,209,667 | 6/1980 | Simokat | 179/17 |
| 4,258,236 | 3/1981 | Conklin et al. | 179/175.3 |
| 4,304,967 | 12/1981 | Gretczko | 179/2 |
| 4,350,849 | 9/1982 | Ahuja | 179/175 |

OTHER PUBLICATIONS

Advertisement of Proctor for Line Test Unit (LTU).

Advertisement of TII Industries for Combination Tip Party Identifier and Ringer Isolator, Issue No. 3, Aug. 1982.

Advertisement of TII Industries for TII-815 Tip Party Identifier, Issue No. 4, Aug. 1982.

Advertisement of TII Industries for Combination Tip Party Identifier and Ring Isolator, Issue No. 7, Aug. 1982.

Advertisement of TII Industries for TII-811 Tip Party Identifier, Issue No. 4, Aug. 1982.

Advertisement of TII Industries for TII 855 Super Fire Fly Isolation Device, Issue No. 1, Aug. 1982.

Advertisement of TII Industries for TII 810 3 Ringer Isolator, (Pat. No. 4,209,667), Issue No. 3, Aug. 1982.

Advertisement of TII Industries for TII 805 Remote Isolation Device, (Time Release), Issue No. 6, Oct. 1981.

Advertisement of TII Industries for Remote Isolation Devices and Line Termination Devices.

Advertisement for Cidcomm International for Remote Line Disconnectors, Bulletin No. 1005.

*Primary Examiner*—James L. Dwyer

*Attorney, Agent, or Firm*—Kenyon & Kenyon

[57] ABSTRACT

Apparatus is disclosed for disconnecting and reconnecting equipment to a telephone line in response to at least one AC signal sent over the telephone line. The equipment can automatically be reconnected after a predetermined time period, or reconnected only after another AC signal is received. The apparatus includes digital circuits for detecting a signal within a predetermined frequency range which is present uninterrupted for a minimum time period to activate switching. The apparatus also includes digital timing circuits which can provide relatively long time periods during which the equipment is disconnected which do not utilize large energy storage devices. The digital circuits of the apparatus are operable at extremely low currents, e.g. less than 30 ua total drain. The regulator utilizes one or more light-emitting diodes drawing a current of only about 5 ua to generate a reference voltage.

19 Claims, 5 Drawing Figures

AC SIGNAL-ACTIVATED SWITCHING APPARATUS

BACKGROUND OF THE INVENTION

The present invention relates to apparatus disposed at a first location and activated from a second location over a link between the first location and the second location. The apparatus to which the present invention relates can include switch means whose switching state is changed when the apparatus is activated over the link. The switch means can be used to disconnect equipment from and/or connect equipment to the link at the first location. More particularly, the present invention relates to apparatus disposed at a subscriber's facility activated from a communication company office over a line linking the communication company office and the subscriber so as to disconnect and/or connect the line and the subscriber's equipment.

Apparatus connected to a telephone line at a subscriber's facility for the purpose of disconnecting subscriber equipment from the line and/or connecting further apparatus to the line in response to a signal sent over the telephone line from a telephone company office are known and are referred to as remote isolation or disconnect devices, line testers, and other terms. The signal sent from the telephone company office can be DC, pulsed or AC, or combinations thereof. Sqme apparatus will disconnect subscriber equipment from the line in response to the signal sent over the line and then automatically reconnect the equipment to the line after the elapse of a controlled time period, which can be measured, for example, from the time of application or removal of the signal, or from the time of disconnecting the equipment. Some apparatus will maintain the subscriber's equipment disconnected until another signal is sent over the telephone line from the telephone company office to reconnect the subscriber's equipment. During the time that the subscriber's equipment is disconnected from the telephone line by apparatus of the type described above, the telephone line up to the subscriber's facility can be tested remotely from a telephone company office. Apparatus of the type described above can terminate the telephone line at the subscriber's facility with a specified impedance including a short or open circuit to provide a known passive signature in place of the subscriber's equipment. It is also known to couple active circuits such as tone generators to the telephone line in place of the subscriber's equipment.

Many of the known apparatus of the type described above which temporarily disconnect and automatically reconnect the subscriber's equipment within a controlled time period include an energy storage device such as a capacitor or a battery which is caused to charge or discharge by or in response to a signal sent from the telephone company office. The charging or discharging capacitor (or battery) causes a switch to change its switching state and disconnect the subscriber's equipment. Thereafter, upon the discharging or charging of the capacitor (or battery), which occurs automatically within some controlled time period after the initial application or subsequent removal of the telephone company activating signal, the switch reverts to its original state to reconnect the subscriber's equipment.

Exemplary of apparatus which include a capacitor or battery which controls a switch are those disclosed in the following U.S. Pat. Nos.: 3,725,613 (Allen et al.), 3,773,986 (Tremblay), 4,054,759 (McGrath et al.), 4,143,250 (Simokat), 4,169,220 (Fields) and RE 29,499 (Spencer).

The capacitor (or battery) can be charged from the telephone signal (as, for example, in the Fields '220 and Pickens et al. '588 patents) or from a power source typically provided as part of the apparatus disposed at the subscriber's facility (as, for example, in the Tremblay '986 patent and the Spencer '499 reissue patent). The use of a capacitor to maintain the switch in a particular switch condition for a period of time as a function of charging or discharging of the capacitor, necessitates the use of a relatively large capacitor and/or a relatively long charging time period, particularly when the time period is relatively long. Large capacitors, particularly the wet-type, are physically relatively large and also are subject to degradation during use from temperature, humidity, etc.

Some known apparatus are activated by one or more AC signals of a predetermined frequency or frequencies. Exemplary of remotely-activated apparatus which respond to one or more frequencies are those disclosed in the following U.S. Pat. Nos.: Re. 29,499 (Spencer); 3,725,589 (Golden); 3,766,366 (Wikholm); 3,843,848 (Cox); 3,849,764 (Wang et al.); 3,852,537 (Vincent); 3,902,016 (Blouch); 3,912,882 (Beerbaum); 3,919,487 (Gabrielson); 3,922,508 (Brady); 3,943,305 (Hagedorn); 4,086,448 (Anglikowski); 4,197,435 (Jackson et al.); 4,258,236 (Conklin et al.); and 4,304,967 (Gretczko).

Typically, where the frequency of the signal which activated the system was required to be detected within relatively narrow limits, phase-locked loops were utilized. See, for example, U.S. Pat. Nos. 3,725,589 (Golden); 3,922,508 (Brady); and 4,197,435 (Jackson et al.). However, one problem with the use of phase-locked loops is temperature stability.

U.S. Pat. No. 4,304,967 (Gretczko)discloses a remotely-activated apparatus in which a counting scheme is used to insure that a signal is present for a minimum time period.

While apparatus activated by a DC signal or DC pulse signal are as a practical matter limited to use with a metallic conductor such as the telephone ring and/or tip lines, apparatus activated by an AC signal sent from the telephone company office are not so limited and may be sent on a carrier over other lines. However, AC-activated systems which include an energy storage device suffer from the drawbacks described above. Some known apparatus which disconnect the subscriber's equipment in response to a first signal sent over the telephone line and maintain the equipment disconnected until a second signal is sent over the telephone line include a relay or other device which is latched in response to the first signal and unlatched in response to the second signal. For example, in U.S. Pat. Nos. 3,919,487 (Gabrielson), 4,041,255 (Cambridge et al.) and 4,126,771 (Proctor et al.), and the Vincent '537 patent, a latching relay is utilized as the latching device and in U.S. Pat. No. 4,258,236 (Conklin et al.) a latching circuit is used as the latching device.

Many prior art remote-activated devices require relatively high power requirements in order to operate, even when in a stand-by mode awaiting the detection of an activating signal.

The present invention provides improved remotely-activated apparatus which does not suffer from the aforementioned drawbacks.

OBJECTS AND SUMMARY OF THE INVENTION

It is the object of the present invention to provide an improved remotely-activated apparatus.

It is another object of the present invention to provide an improved remotely-activated switching apparatus.

It is another object of the present invention to provide an improved remotely-activated, digital circuit apparatus.

It is another object of the present invention to provide an improved remotely-activated switching apparatus in which a switch in the apparatus when remotely activated by an AC signal is switched to a temporary switch condition in which it is maintained after removal of the activating signal and then automatically switched back to a normal switching condition.

It is another object of the present invention to provide a remotely-activated switching apparatus of the type described in the immediately preceding paragraph in which the time that the switch is maintained in the temporary switch condition is not directly dependent on the energy being stored or removed from an energy storage device.

It is another object of the present invention to provide an improved remotely-activated switching apparatus in which a switch in the apparatus when remotely activated by an AC signal is switched to a switch condition in which it is maintained until remotely activated again to return the switch to its former switch condition.

It is another object of the present invention to provide a apparatus remotely-activated by an AC signal in which the AC signal can be detected within narrow limits.

It is another object of the present invention to provide improved switching apparatus activated by an AC signal.

It is another object of the present invention to provide improved switching apparatus activated by an AC signal including digital circuitry for detecting the AC signal.

It is another object of the present invention to provide AC-signal remotely-activated apparatus having improved temperature stability with respect to detection of the frequency of the AC signal.

It is another object of the present invention to provide remotely-activated apparatus which operates at extremely low power consumption levels.

It is another object of the present invention to provide regulated DC power for any of the above apparatus and circuits which provides extremely low currents while operating at extremely low power consumption.

It is another object of the present invention to provide circuitry which receives AC or DC power and provides regulated DC power at extremely low power consumption and extremely low currents.

It is another object of the present invention to provide remotely-activated switching apparatus which are simple and inexpensive, have a minimal number of components, are rugged, and have increased reliability.

The invention disclosed herein in its different aspects achieves the above and other objects.

According to the invention disclosed herein, the frequency of an AC signal which activates or controls the state of the apparatus can be accurately and repeatably determined, and the apparatus can be maintained in a given state for long periods of time without directly using the energy which energizes or deenergizes an energy storage device. Moreover, the inventive apparatus is extremely temperature stable with respect to detection of the frequency of the AC-activating signal and consumes very low power. In one of its aspects, the invention utilizes digital circuits for detecting the frequency of the signal or signals which activate or control the state of the apparatus and for maintaining the apparatus in a given state.

More particularly, apparatus according to the invention is adapted to be coupled to a link such as a telephone line and the like and to equipment to connect or disconnect the equipment from the link in response to a signal transmitted on the link from a location remote from the location at which the apparatus is located. The apparatus comprises switch means coupled to the link and to the equipment so as to connect and disconnect the link and the equipment in respective switch states of the switch means, first means for detecting the presence for a predetermined minimum time period of a signal having a frequency within a first predetermined frequency range defined by a first predetermined lower frequency and a first predetermined higher frequency and providing an output signal, and means coupled to the detecting means to receive the output signal and cause the switch means to change state in response thereto. The detecting means comprises means for counting pulses adapted to be coupled to the link and receive the signal from the link directly or indirectly through the switch means, the counting means producing an output signal when the number of pulses received by it exceeds a first predetermined number within a first time period corresponding to said predetermined lower frequency and is less than a second predetermined number within a second time period which is greater than the first time period corresponding to said predetermined higher frequency, and further means coupled to the counting means for receiving the output signal from the counting means and providing an output when the number of output signals received from the counting means is greater than a predetermined number within said predetermined minimum time period.

Means such as an oscillator for generating timing periods is coupled to the means for detecting. The timing periods are used to generate the time periods described above.

According to a preferred embodiment, the means for counting is coupled to the timing means and is adapted to be coupled to the link to receive the signal from the link, the counting means producing a first output signal when the number of pulses received by it exceeds said first predetermined number within said first time period, and producing a second output signal when the number of pulses received by it exceeds said second predetermined number within said second time period, said further means comprising further means for counting coupled to said counting means to receive said first and second output signals and to said timing means, said further counting means providing its output signal when a predetermined number of consecutive first output signals are received by it within said predetermined minimum time period.

The counting means comprises at least one counter, the timing means being coupled to the counter and providing a signal to the counter having a period equal to the first time period for resetting the counter, the counter providing the first output signal when the number of pulses counted by it exceeds the first predetermined number within the period of the signal, and also providing the second output signal when the number of pulses counted by it exceeds the second predetermined number within the period of the signal, the first output signal being coupled to an input of the further counting means effect to count first output signals and the second output signal being coupled to an input of the further counting means effective to clear or reset the further counting means.

The detecting means in one embodiment comprises an OR circuit having an input coupled to receive the second output signal and its output coupled to the reset or clear input of the further counting means, the OR circuit having another input coupled to the timing means to receive the signal so that the further counting means is reset or cleared by the second output or the timing signal.

The means for causing in one embodiment causes the switch means to change state when the output signal is received for a predetermined time period after which the switch means automatically reverts to its previous state. According to this embodiment, the means for causing can comprise a monostable multivibrator having its input coupled to said detecting means to receive said output signal and its output coupled to the switch means. The monostable multivibrator can comprise a conventional one-shot having its time period set by a capacitor and an associated charging and/or discharging circuit, or a flip-flop connected with one of its inputs coupled to the detecting means, one of its outputs coupled to the switch means, the other of its output coupled to a counting circuit, and another of its inputs coupled to the output of the counting circuit, the flip-flop being set by the output signal and reset by the counting circuit after the counting circuit counts a predetermined time.

The switch means can comprise a relay having a relay coil whose energization state is controlled by the means for causing, or a solid state switch.

The switch means can also comprise a first latching relay having a relay coil whose energization state is controlled by the means for causing and a second latching relay having a relay coil whose energization state is controlled by the means for causing. In this embodiment, the apparatus includes second means for detecting the presence for a predetermined minimum time period of a signal having a frequency within a second predetermined frequency range defined by a second predetermined lower frequency and a second predetermined upper frequency, the second detecting means being similar to the first detecting means and detecting another signal frequency.

According to one aspect of the invention, the detecting means and the further means are digital circuits operating at a total current drain of less than 100 ua, preferably less than 50 ua and most preferably in the range of about 5 ua to about 30 ua.

The digital circuits can be discrete or provided as a single integrated circuit.

According to another aspect of the invention, a circuit is provided which regulates low voltage DC power, e.g. 3 v, at extremely low currents, i.e. at less than about 100 ua. The circuit can regulate at less than about 50 ua and preferably in the range of about 5 ua to about 30 ua. The use of digital circuits in accordance with the invention enables the apparatus to operate at such low currents. According to this aspect of the invention, one or more light-emitting diodes are used to provide a reference voltage to the circuit. The applicants have found it surprising and unexpected that a light-emitting diode can provide a stable reference voltage at low currents of less than about 50 ua. For example, the applicants have found that light-emitting diodes can provide a stable reference voltage at currents of from about 0.5 ua to 10.0 ua. In order to provide temperature stability to the output voltage of the regulator, the number of light-emitting diodes can be selected in accordance with the number of semiconductor junctions which affect the output voltage with temperature changes, the light-emitting diodes and the semiconductor junctions having opposite temperature coefficients. The number of light-emitting diodes can further be selected in cooperation with further semiconductor junctions to provide the desired reference voltage.

A regulator circuit according to the invention can, as indicated above, be used to provide regulated power to a remotely-activated device so that very little power need be supplied to the remotely-activated device to operate it (exclusive of power supplied to a relay, for example). Such a remotely-activated device can thereby be connected to a telephone line, for example, and draw extremely low power from the line. Moreover, alternatively or as a stand-by, a small battery could be used to power the device as regulated by the inventive circuit.

The above and other objects, aspects, features and advantages of the invention will be more readily perceived from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in wnich like references indicate similar parts and in which.

FIGS. *3a* and *3b* are circuit diagrams of a tone-activated remote isolation device according to the embodiment of FIG. 1.

DESCRIPTION OF THE PREFERRED EMBODIMENTS

With reference now to the drawings, remotely-activated apparatus, referred to in a non-limiting sense as remote isolation devices, are illustrated. Although remotely-activated apparatus are illustrated and described in association with operation from and in cooperation with a telephone line for disconnecting and connecting equipment and apparatus to the telephone line at a telephone subscriber's facility, it is to be understood that the invention is not limited to such use, which is described in an exemplary sense. For example, the invention is applicable to be used in communication, control, security systems, etc., telephone systems and other system, and is adapted to be connected to links other than telephone lines, for example microwave or other radio or electromagnetic links or light energy links, etc. Moreover, the term "telephone company" is meant in a general and broad sense.

Figure 1:
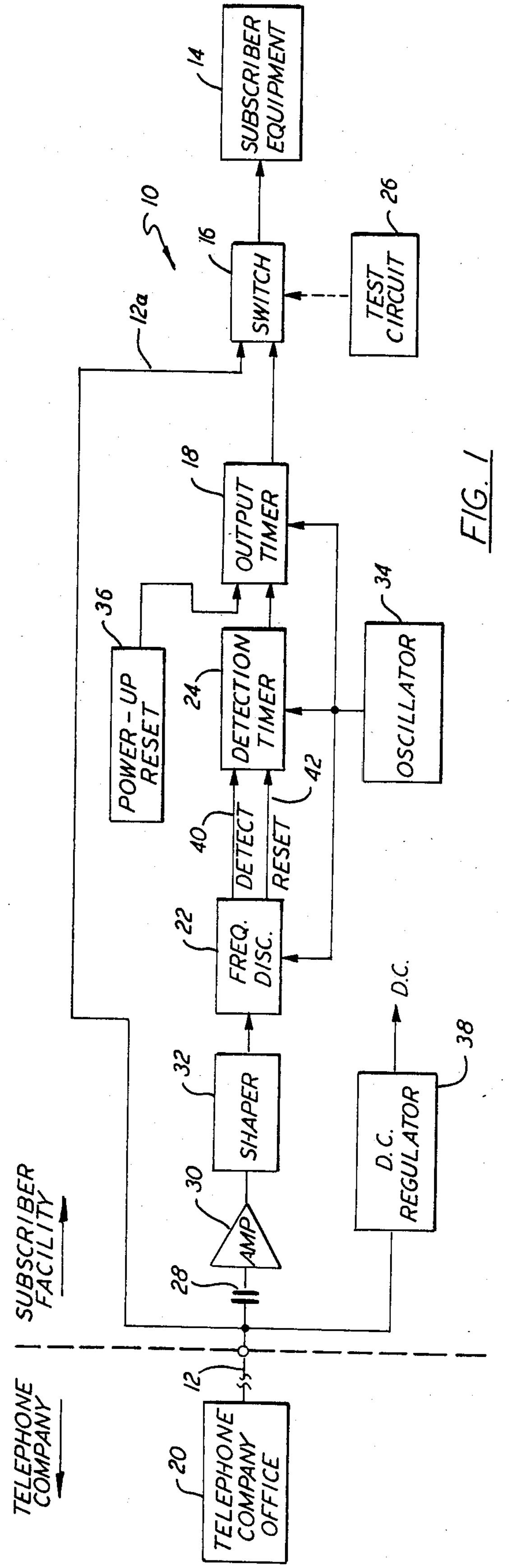
FIG. 1 is a block diagram of a tone-activated remote isolation device according to one embodiment of the invention.

The remote isolation device 10 depicted in FIG. 1 is connected between a telephone company line 12 and subscriber equipment 14. The telephone company line 12 is coupled to the subscriber equipment through a switch 16, which could be a relay or a solid state switch, for example. The state of switch 16 is switched and controlled by an output timer 18 upon the detection of a signal on line 12 from the telephone company office 20 of a predetermined frequency for a predetermined time by frequency discriminator 22 and detection timer 24. The switched state of switch 16 is maintained by the output timer 18 for a predetermined time period after which the switch is automatically switched back to its original state. In the original state of switch 16, the subscriber equipment 14 is connected to the telephone company line 12 and in the switched state, the subscriber equipment is disconnected from the telephone line, although the switch can be structured, if desired, to disconnect subscriber equipment in the original switch state and to connect the subscriber equipment in the switched state.

Preferably the output timer 18 which controls the length of time that the switch is maintained in its temporary, switched state does not include an energy storage device such as a capacitor, the charging or discharging of which directly controls the switching state of the switch.

The line 12 to the subscriber's facility can be tested remotely from the telephone company office in known manner up to an excluding the subscriber's equipment during the time that the subscriber's equipment is disconnected by the switch 16. A test circuit 26 can be coupled to the switch 16 so that the switch connects the test circuit 26 to the line 12*a* (coupled to line 12) at the same time that the subscriber's equipment is disconnected. The test circuit 26 can be a passive line termination, or an active circuit for transmitting a signal from the subscriber's facility to the telephone company office.

The tone-activated remote isolation device 10 further includes: a capacitor 28 coupled to the telephone company line 12 for coupling AC signals to the device 10 while blocking DC signals; an AC amplifier 30 coupled to the capacitor 28 for amplifying AC signals coupled by the capacitor; and a waveform shaper 32 coupled to the AC amplifier for shaping the AC signal for use by the frequency discriminator 22. The frequency responses of the capacitor 28, amplifier 30 and shaper 32 are selected in accordance with the frequency or frequencies to which the device 10 is to be responsive.

The amplified and shaped AC signal is supplied to the frequency discriminator 22 which is preferably a digital frequency discriminator. The frequency discriminator 22 is coupled to the detection timer 24 which determines whether the AC signal of the predetermined frequency detected by the frequency discriminator is continuously present for a predetermined minimum period of time. The detection timer thereby insures that tone-activated device 10 rejects transient AC signals even if they are of the predetermined frequency. Coupled to the detection timer 24 is the output timer 18 which provides an output for a predetermined time period upon detection by the detection timer of the AC signal for the predetermined minimum time period. The output timer is coupled to and controls switch 16, as described above.

An oscillator 34 is coupled to the frequency discriminator 22, the detection timer 24 and the output timer 18 to provide timing and reset signals. A power-up reset 36 provides a reset to the output timer 18 which prevents the output timer from providing an output when the tone-activated device first receives power. This prevents the switch 16 from being activated while the frequency discriminator, the detection timer and the output timer are being initially set by the oscillator 34.

A DC regulator 38 is connected to the telephone line 12 and receives an AC or DC voltage present on the line, and inverts or converts it to a regulated DC voltage used to power the device 10. The telephone company office has available AC and DC voltages which can be inverted or converted by the regulator to power the device. Preferably, the regulator converts the 48 v DC signal continuously present on the telephone company line 12 to a regulated DC voltage or voltages suitable to power the components of which the device 10 is comprised.

In operation, an AC signal received by the amplifier 30 is amplified and provided to the frequency discriminator 22 after being shaped by the shaper 32. Typically, AC signals supplied by the telephone company are sinusoidal. For use in a digital system, the sinusoidal signals are converted to pulsed or square wave signals by the shaper 22 which can simply comprise an inverter. The frequency discriminator 22 within the timing period set by the oscillator 34 determines if the AC signal is of the proper frequency or not. If it is, then a detect output signal is provided on the detect output 40 of the discriminator to the detection timer. If the AC signal is not of the proper frequency during an oscillator timing period, then a reset output signal is provided on the reset output 42 of the discriminator to the detection timer. If an output signal is provided on the detect output 40 for a predetermined number of consecutive oscillator timing periods corresponding to the predetermined time, then the detection timer 24 provides an output to the output timer 18. If a signal of the predetermined frequency is not detected during any oscillator timing period, a reset output signal is provided on reset output 42 to the detection timer. The detection timer will not provide an output to the output timer if it receives a reset output signal interrupting consecutive detect output signals before a predetermined number of consecutive detect signals corresponding to the predetermined minimum time period are received. If neither a detect output signal nor a reset output signal is provided by the frequency discriminator within any predetermined timing period, indicating the absence of an AC signal, the detection timer is reset by the next oscillator timing period signal from the oscillator. However, once the output timer 18 provides an output to the switch 16, it maintains that output for a predetermined time regardless of subsequent detect and reset output signals from the detection timer. The switch 16 thereby remains activated for the predetermined period once an AC signal of the predetermined frequency and duration has been detected. Testing of the telephone line from the telephone company office to the subscriber's facility can be conducted during this time.

Figure 2:
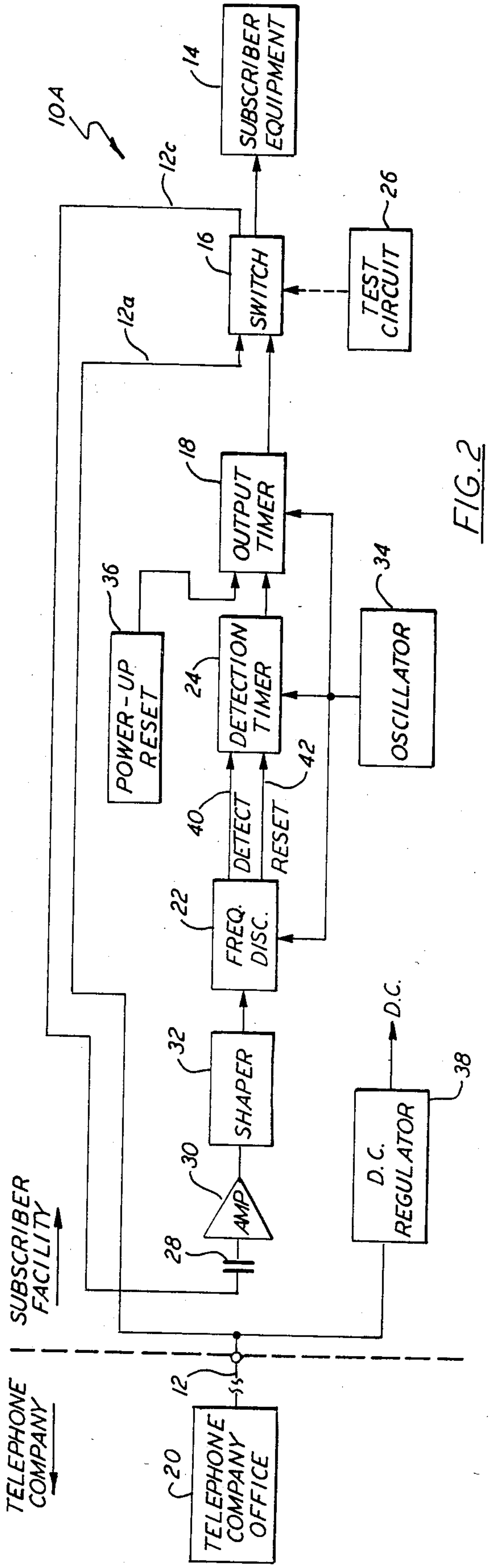
FIG. 2 is a block diagram of a tone-activated remote isolation device according to another embodiment of the invention.

The detection portion of the remote isolation device 10 in FIG. 1 is connected directly to the telephone line 12 and remains connected regardless of the state of switch 16 and regardless of whether the subscriber's equipment is connected to the telephone company line through the switch 16 or not. According to another embodiment, as depicted in FIG. 2, the detection portion of a remote isolation device 10A can be connected to the telephone company line 12 through the switch 16*a* and a line 12*c*. The switch 16*a* disconnects the detection portion of the device from the telephone line 12 when the subscriber equipment is disconnected. As a result, the detection portion of the device 10A does not receive any test signals transmitted from the telephone company office, and does not affect any test being carried out from the telephone company office. Although the input impedance of the detection portion of the devices 10, 10A is high by virtue of selection of a high input impedance amplifier 30, in some instances it may be desirable to have the detection portion disconnected during a test. While the DC regulator 38 remains connected, it also has a high input impedance so as to essentially not affect testing from the telephone company office. If desired, a source of power other than through the telephone company line 12 can be provided, for example, a battery, so that the DC regulator is not connected to the telephone line 12.

The DC regulator can also be connected to the switch 16*a* (line 12*c*) to accept power from the line under normal operating conditions and from a battery when the switch 16*a* is activated to disconnect the subscriber equipment. Other variations are also possible.

The embodiments of FIGS. 1 and 2 have been described for the case in which it is desired to disconnect the subscriber's equipment. However, the switches 16 and 16*a* can be configured and connected so as to temporarily connect the subscriber's equipment.

Figures 3, 3A:
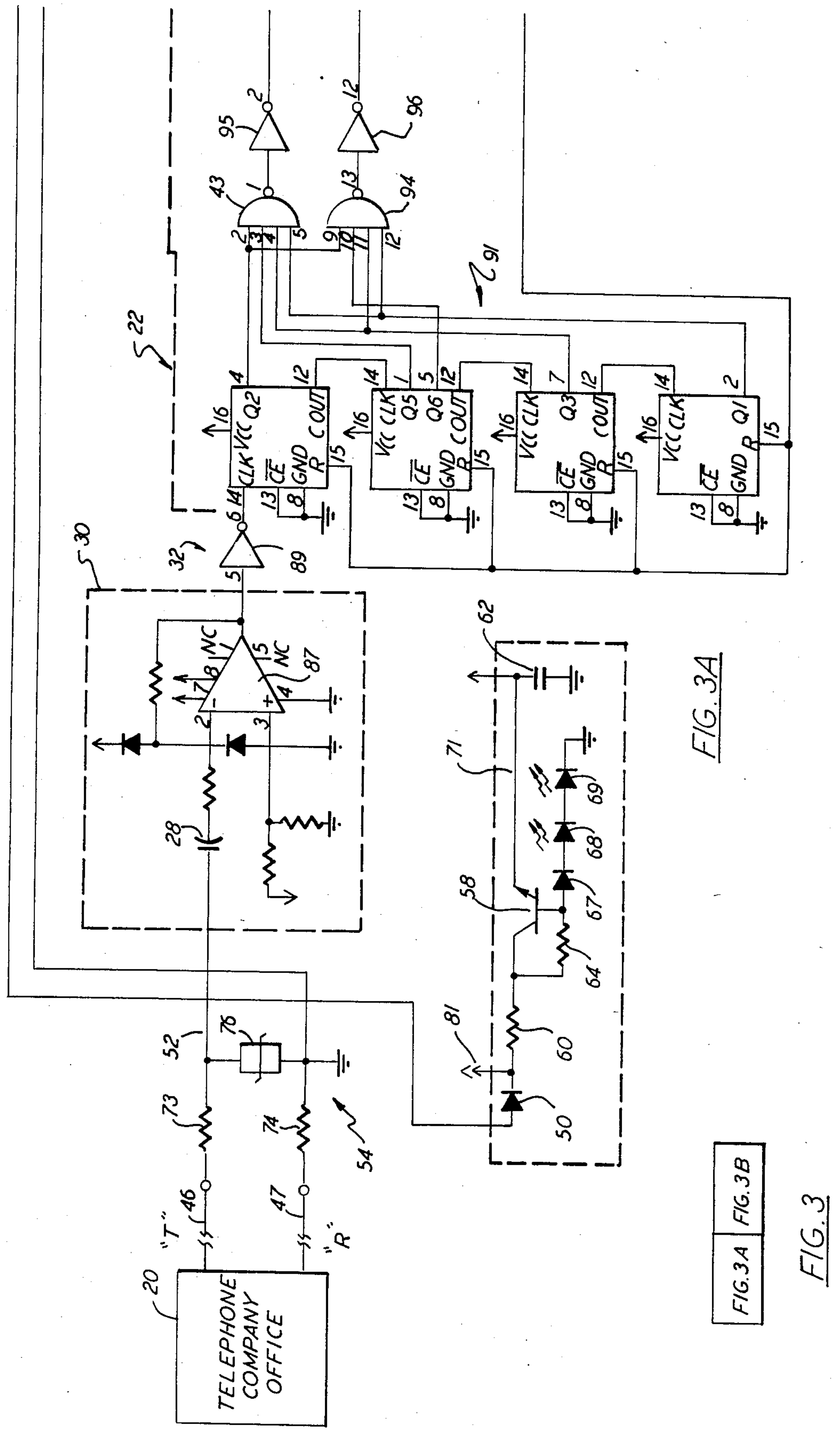
Figure 3B:
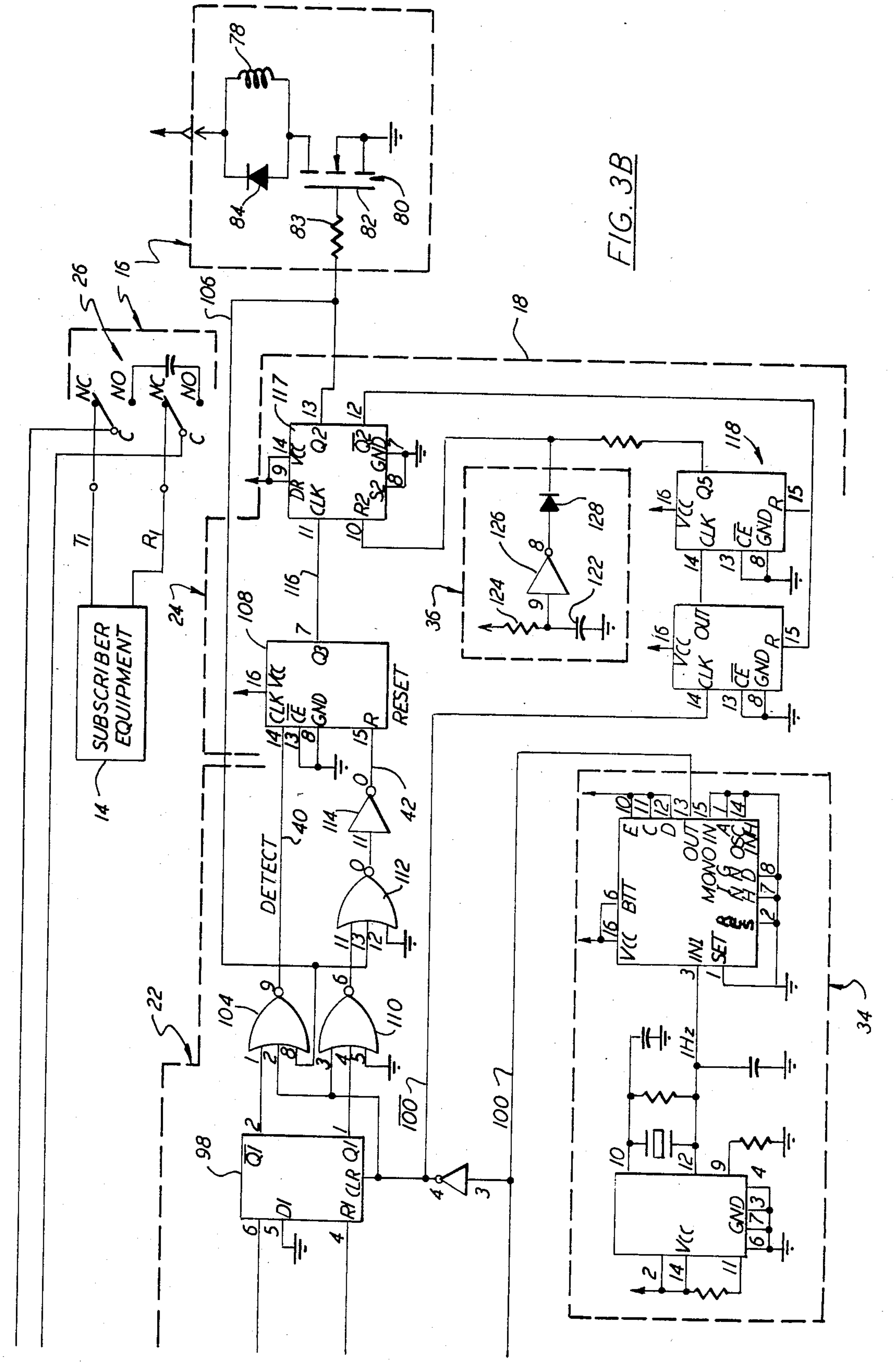

FIG. 3 depicts a digital tone-activated remote isolation device according to the embodiment of FIG. 1. The same reference numbers are used to designate the circuit portions of the tone-activated device depicted in FIG. 3 which correspond to like-numbered block elements depicted in FIG. 1. The digital tone-activated remote isolation device 10B depicted in FIG. 3 responds to an AC signal of a predetermined frequency, for example a frequency of 2713±10 Hz, present for a predetermined minimum time period, for example about 4.5 second uninterrupted. Upon detection of such a signal, the switch 16 is activated for a predetermined time period, for example, about 20 seconds. However, the frequency and time periods selected are for purposes of illustration and the invention is applicable to other frequencies and time periods. To provide the frequency detection and timing periods stated above, the oscillator 34 timing period selected is 0.5 second. However, other timing periods can also be used.

The DC regulator 38 can be of any conventional type suitable for supplying DC power to the digital circuits used in the device 10B. For example, 48 v DC is available from the telephone company office and is substantially continuously present on the telephone company tip ("T") 46 and ring ("R") 47 lines at the subscriber facility. The DC regulator 38 can drop and regulate the 48 volts as necessary, and in cooperation with a surge protector 54, which will be described below.

However, one object of the invention disclosed herein is to provide a tone-activated remote isolation device of extremely low power consumption. The DC regulator of the invention, an embodiment of which is depicted in FIG. 3, and the use of low power consumption digital circuits and a low power switch achieves this object of low power consumption. As described earlier, a remote isolation device constructed in accordance with the invention draws less than about 100 ua, typically in the range of 5 ua to 20 ua–30 ua, excluding current drawn by the switch which may include a relay coil. The DC regulator 38 includes a diode 50 coupled to the device input conductor 52 which is coupled to the tip line 46 through the surge protector 54. Diode 50 in the embodiment depicted is polled to block negative voltages to the DC regulator.

The DC regulator 38 includes a transistor 58 having its collector coupled to the diode 50 through resistor 60 and its emitter, the output of the regulator, connected to filter capacitor 62. The base of transistor 58 is connected to a biasing arrangement which includes resistor 64, diode 67 and light-emitting diodes (LED's) 68 and 69. Biasing resistor 64 is connected between the base and emitter of the transistor and the light-emitted diodes are connected between the base and common or circuit ground. The applicants have found that the LED's 68 and 69 when forward biased at low currents provide a stable reference voltage to the base of transistor 58. Diode 67 is provided primarily to obtain a desired reference voltage. A reference voltage of approximately 3 volts is provided by diodes 67–69 at about 5 ua. The applicants have surprisingly found that even at such low currents, the LED's provide a stable reference voltage. Moreover, since the temperature coefficients of an LED and a silicon semiconductor junction are opposite, the overall temperature stability can be compensated by selection of LED's and silicon semiconductor junctions. Diode 67 is included because it has a lower forward bias voltage than an LED. The two LED's, the diode 67 and the base-emitter junction of the transistor provide an output voltage for the regulation of about 3 volts. If a different reference voltage is desired, a different number of LED's and diodes can be used. The particular LED used is not critical. Resistor 60 is selected to limit the current which the regulator can draw and the maximum current available to the diodes 67–69 and can be, for example, 10M ohms. Thus for a 48 v. DC source, the current available to the diodes 67–69 will be in the order of less than 5 ua. Heretofore, it was not recognized that LED's can function as stable voltage reference sources at low currents of less than 50 ua, for example in the approximate range of 0.5 ua to 10 ua.

The regulated DC output 71 of the regulator is filtered by capacitor 62 connected between the output 71 and common. The regulated DC output is supplied to the various components and circuits as indicated by the arrows in FIG. 3.

The surge and overvoltage protector 54 includes resistors 73 and 74 respectively coupled to the telephone company tip 46 and ring 47 lines and a varistor 76 coupled between the resistors on the device 10B side of the resistors. As is well known, the resistance of the varistor decreases with the current through the varistor so that excessive voltages will be shunted by the varistor. The protector 54 protects in known manner against surges and peaks which could occur, for example, from lightning or crossing of a telephone company line with a power line.

The unregulated DC voltage present on line 46 is supplied to the switch 16 which includes a relay comprising a relay coil 78, switch contacts and a relay drive 80. The relay drive 80 is a semi-conductor switch which completes a DC circuit from the unregulated DC after diode 50 (output 81) through the relay coil to common to control energization of the coil 78. The semi-conductor switch can comprise any suitable semiconductor driving device 82, which is preferably a field effect transistor. A limiting resistor 83 is coupled to the input of the semiconductor device 82.

A diode 84 is connected across the relay coil 78 so that the energy in the coil is not dumped into the semiconductor switch 80 when it is turned off to deenergize the coil.

The relay is a double pole double throw switch. One pair of relay terminals is connected to the subscriber's equipment 14. Another pair of relay terminals is connected to test circuit 26. The test circuit 26 can be active or passive and will be described in more detail below. The wiper contacts of the relay are respectively connected to the telephone company tip 46 and ring 47 lines.

The relay is in the normally closed (NC) position of FIG. 3 when the coil is deenergized. Thus, the relay normally connects the subscriber's equipment to the telephone company tip and ring lines. Upon energization of the relay coil 78, the relay disconnects the subscriber's equipment from the telephone company tip and ring lines and connects the test circuit 26 to the tip and ring lines. Testing of the telephone company lines to the subscriber's facility can then be tested. For example, the test circuit 26 can comprise a capacitor which loads an AC or pulsed test signal sent from the telephone company office in a predetermined manner.

AC amplifier 30 comprises an operational amplifier 87 connected to the input conductor 52 to amplify an AC signal to a level compatible with the digital circuits of device 10B, particularly inverter 89 which constitutes the wave shaper 32. For example, operational amplifier 30 amplifies a signal in the range of about −30 dbm to about 0 dbm (24 mv to 1.1 v with a 600 ohm reference) to be compatible with digital circuits. Inverter 89 connected to the output of the operational amplifier shapes the AC signal and converts a sine wave to a square wave. Alternatively, the operational amplifier can be driven into hard limiting so that its output is essentially a square wave.

The frequency discriminator 22 comprises counting circuitry including a number of counting stages 91 having preselected outputs to indicate two predetermined counts — one corresponding to a low frequency limit within the timing period of the oscillator 34 and the other corresponding to a high frequency limit within the timing period of the oscillator 34. For example, for an oscillator timing period of 0.5 sec and for detecting a 2713 Hz ±10 hz tone, the lower frequency limit count is 1351 (2703 Hz/2) and the upper frequency limit count is 1361 (2723 Hz/2). The outputs of the counting states are decoded by NAND gates 93 and 94 to provide the signals representing the upper and lower frequency limits. Those signals are inverted by inverters 95 and 96 and fed to flip-flop 98. The lower limit signal is fed to the set(s) input and the upper limit signal to the reset (R) input of the flip-flop. The timing period signal output 100 from the oscillator 34 is converted by inverter 101 and fed to the clock (CLK) input of the flip-flop as the inverted timing signal $\overline{100}$. If a lower limit signal is decoded by NAND gate 93 within the timing period, and an upper limit signal is not, the flip-flop is set with the next timing period signal from the oscillator. If both a lower limit signal is decoded by NAND gate 93 and upper limit signal is decoded by NAND gate 94 within the timing period, the flip-flop 98 is not set since the upper limit signal resets the flip-flop when the next timing period signal is input to the flip-flop from the oscillator.

The complementary ($\overline{Q}$) output of flip-flop 98 is coupled to one input of a three input NOR gate 104. The second input of the NOR gate 104 is coupled to the inverted oscillator timing period signal $\overline{100}$ and the third input is coupled to the output 106 of the output timer 18. The output of the NOR gate 104 is the detect output 40 and is coupled to the clock (CLK) input of counter 108 of the detection timer 24. The true (Q) output of flip-flop 98 is coupled to one input of another three input NOR gate 110. The second input of NOR gate 110 is coupled to the inverted timing period signal $\overline{100}$ and the third input is connected to common. The output of NOR gate 110 is coupled to one input of a three input NOR gate 112. The second input of NOR gate 112 is coupled to the output 106 of the output timer 18 and the third input is connected to common. The output of gate 112 is coupled through an inverter 114 to the reset (R) input of counter 108. The output of inverter 114 is the reset output 42 of the frequency detector 22.

A detect signal is provided on output 40 each time flip-flop 98 is clocked by the oscillator timing period $\overline{100}$ when a lower frequency limit level from gate 93 is present at the set(s) input of flip-flop 98. If flip-flop 98 is clocked by the oscillator when an upper frequency limit level from gate 94 is present at the reset (R) input to the flip-flop 98, a reset signal is provided at reset output 42. The connection of the output 106 of the output timer 18 to an input of each or NOR gates 104 and 112 insures that neither a detect nor a reset output is provided while the relay coil 78 is energized. The third inputs to NOR gates 110 and 112 are superfluous and are therefore connected to common.

Counter 108 of the detection timer 24 simply counts detect pulses. The output 116 of the counter 108 is the counter output preselected to indicate a count of detect pulses corresponding to the presence of the detected AC signal for 4.5 seconds. For a 0.5 second oscillator timing period, the nine count output of counter 108 is preselected. If a reset signal on reset output 42 occurs before nine consecutive detect signals, then the AC signal was not present, uninterrupted, for between 4 and 5 seconds (the oscillator and the counter 108 are asynchronous with respect to each other) and the counter 108 will not provide an output signal on the preselected output 116.

The output 116 of counter 108 is coupled to the clock (CLK) input of flip-flop 117 of output timer 18. The reset (R) input of flip-flop 117 is coupled to the output of a two-stage counter 118 preselected to indicate a count of 40 (oscillator timing periods) corresponding to a 20 second output timing period. The oscillator 34 output $\overline{100}$ is coupled to the clock (CLK) input of the first stage of the two-stage counter. The true (Q) output of flip-flop 116 is the output of the output timer 18 and is coupled to relay drive 80 of switch 16. When the flip-flop 117 is set by the detection timer 24 as described above, it provides a signal at its Q output to the semiconductor drive device 82 via resistor 120. The Q signal output from flip-flop 117 turns semiconductor 82 on to complete a path from the regulator output to common through the relay coil to energize the coil for the output timing period. The complimentary ($\overline{Q}$) output of flip-flop 117 is coupled to the reset inputs of the two stages of the counter 118 to reset the counters after a 20 second output timing period.

Thus, the invention can provide relatively long periods in which the subscriber's equipment is disconnected without using large energy storage devices.

The power-up reset 36 comprises a capacitor 122 connected between common and the output of the DC regulator through resistor 124. An inverter 126 is coupled to the junction of the capacitor 122 and resistor 124. The output of the inverter 126 is coupled to the reset (R) input of flip-flop 116 through diode 128. Upon initially supplying power to the device 10B, the voltage at the junction of capacitor 122 and resistor 124 goes to common causing the inverter 126 output to go high. The high inverter output resets the flip-flop 116 and prevents its output from going high until the capacitor 122 has charged. Values of capacitance and resistance can be selected to disable the flip-flop for a few seconds. Diode 128 blocks output pulses from the two-stage counter.

Oscillator 34 can be any conventional oscillator circuit.

The test circuit 26 can be an open circuit or one or more passive circuit elements such as resistors, diodes, capacitors, inductors, etc. Alternatively, test circuit 26 can be active and generate a signal to be transmitted to the telephone company office. In device 10B, the test circuit 26 is constituted by a capacitor, as described above.

Figure 4:
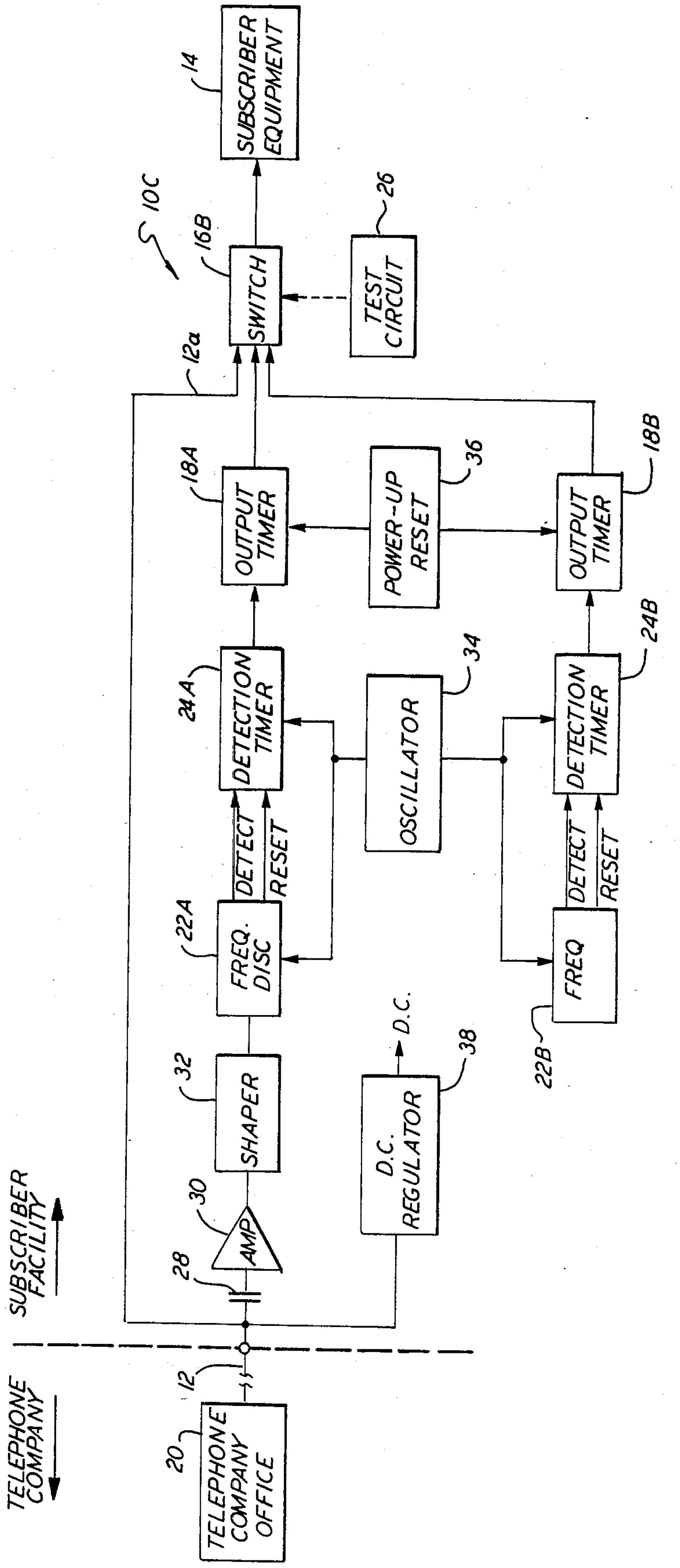
FIG. 4 is a block diagram of a tone-activated remote isolation device according to another embodiment of the invention

Another embodiment of a tone-activated remote isolation device 10C is depicted in block form in FIG. 4. Device 10C differs from device 10 of FIG. 1 in that the switch 16B is caused to switch from a first state to a second state upon detection of an AC signal of a first frequency present for a predetermined time and then remain in the second state. Upon a subsequent detection an AC signal of a second frequency present for a predetermined time, the switch is caused to switch back to the first state. Device 10C includes two frequency detectors 22A, 22B and two detection timers 24A, 24B which are similar to the frequency detector and detection timer of FIGS. 1 and 3. The first frequency detector 22A and detection timer 24A operate to detect the presence of a first frequency signal for a predetermined time as described with respect to FIGS. 1 and 3. However, it is only necessary that the output of the detection timer 24A cause the switch 16B to switch from the first to the second state, but not back to the first state. The output of the detection timer can thus be coupled to an output timer 18A which provides an output only for the time period necessary to cause the switch 16B to switch. The output timer 18A can thus be a conventional monostable multivibrator having its input coupled to the output of the detection timer. The output timer 18A can also be a flip-flop having its clock input coupled to the output of the detection timer 24A to provide a latched output to the switch 16B. The detection timer 24B is connected to the flip-flop to reset the flip-flop and cause the switch 16B to switch back to its first switch state. The detection timer can also simply be a pulse of sufficient duration to cause latching of the switch.

In the embodiment of FIG. 4, another frequency discriminator 22B and detection timer 24B detect the presence of the second frequency signal to switch the switch 16B back to the first state. The output timer 18B again need only provide an output signal for the time necessary to cause switch 16B to switch and can comprise a monostable multivibrator or a flip-flop as described above.

The power-up reset is connected to both output timers 18A, 18B in the FIG. 4 embodiment to prevent switching activation of the output timers during power up. If a flip-flop is used as the output timer, a logic circuit can be interposed between the switch and flip-flop to prevent activation of the switch during power up.

The switch in the FIG. 4 embodiment can comprise a two coil latching relay.

Operation of the DC regulator, amplifier, shaper, frequency discriminator and detection timers for the FIG. 4 embodiment as described for the embodiment of FIG. 2.

The latching device of FIG. 4 can be used in a party line to disconnect individual telephones, where different frequencies will be used to disconnect and reconnect individual phones. The number of frequency discriminator/detection timer pairs will depend on the number of telephones connected in the party line.

As mentioned above, either discrete components or a single integrated circuit could be used for the circuit of FIG. 3, except for the relay and the relay drive. With an integrated circuit, current levels can be maintained low and specialized functions achieved. For example, the oscillator can be provided with several timing periods, one or more of which are brought out of the chip to provide timing for other circuits. For example, the oscillator can provide different timings for the detection timers of FIGS. 1 and 2, and 4, since the detection timers of those embodiments are required to activate the switch for different time periods.

Use of digital circuits in accordance with the invention provides a device which is relatively temperature insensitive and draws very low current.

Certain other changes and modifications of the disclosed embodiments of the invention will be readily apparent to those skilled in the art. It is the applicants' intention to cover by the claims all those changes and modifications which could be made to the embodiments of the invention herein chosen for the purposes of disclosure without departing from the spirit and scope of the invention.

What is claimed is:

1. Apparatus adapted to be coupled to a link such as a telephone line and the like and to equipment to connect or disconnect the equipment from the link in response to a signal transmitted on the link from a location remote from the location at which the apparatus is located, the apparatus comprising:

switch means adapted to be coupled to the link and to the equipment so as to connect and disconnect the link and the equipment in respective switch states of the switch means;

first means for detecting the presence for a predetermined minimum time period of a signal having a frequency within a first predetermined frequency range defined by a first predetermined lower frequency and a first predetermined higher frequency, said detecting means comprising means for counting pulses adapted to be coupled to the link and receive the signal from the link, said counting means producing an output signal when the number of pulses received by the counting means exceeds a first predetermined number within a first time period corresponding to said predetermined lower frequency and is less than a second predetermined number within a second time period which is greater than the first time period corresponding to said predetermined higher frequency, and further means coupled to the counting means for receiving the output signal from the counting means and providing an output signal when the number of output signals received from the first counting means is greater than a predetermined number within said predetermined minimum time period; and means coupled to the detecting means to receive said output signal from said further means for causing the switch means to change state in response thereto.

2. The apparatus according to claim 1 and including timing means for generating timing periods coupled to said means for detecting, said time periods being determined in dependence on the timing periods of said timing means.

3. The apparatus according to claim 2 wherein said counting means is coupled to said timing means and is adapted to be coupled to the link to receive the signal from the link, said counting means producing a first output signal when the number of pulses received by said counting means exceeds said first predetermined number within said first time period and producing a second output signal when the number of pulses received by said counting means exceeds said second predetermined number within said second time period, said further means comprising further means for counting coupled to said counting means to receive said first and second output signals and to said timing means, said further counting means providing its output signal when a predetermined number of consecutive first output signals are received by said further counting means within said predetermined minimum time period.

4. The apparatus according to claim 3 wherein said counting means comprises at least one counter, said timing means being coupled to said at least one counter and providing a signal thereto having a period equal to said first time period for resetting said at least one counter, said at least one counter providing said first output signal when the number of pulses counted by said counting means exceeds said first predetermined number within the period of said signal, said at least one counter providing said second output signal when the number of pulses counted by said counting means exceeds said second predetermined number within the period of said signal, said first output signal being coupled to an input of said second counting means effective to count first output signals and said further output signal being coupled to a an input of said further counting means effective to clear or reset the further counting means.

5. The apparatus according to claim 4 wherein said detecting means comprises an OR circuit having an input coupled to receive said second output signal and its output coupled to reset or clear input of said further counting means, said OR circuit having another input coupled to said timing means to receive said timing signal so that said further counting means is reset by said second output or said timing signal.

6. The apparatus according to claim 1 wherein said means for causing causes said switch means to change state when said output signal of said further means is received for a predetermined period time period after which the switch means automatically reverts to its previous state.

7. The apparatus according to claim 6 wherein said means for causing comprises a monostable multivibrator having its input coupled to said further means to receive its output signal, and its output coupled to said switch means.

8. The apparatus according to claim 7 wherein said monostable multivibrator comprises a flip-flop having one of its inputs coupled to said further means, one of its outputs coupled to said switch means, the other of its outputs coupled to a counting circuit, and another of its inputs coupled to the output of said counting circuit, said flip-flop being set by said output signal and reset by said counting circuit after the expiration of said predetermined time.

9. The apparatus according to claim 1 wherein said switch means comprises a relay having a relay coil whose energization state is controlled by said means for causing.

10. The apparatus according to claim 1 wherein said switch means comprises a first latching relay having a relay coil whose energization state is controlled by said means for causing, a second latching relay having a relay coil, said apparatus including second means for detecting the presence for a predetermined minimum time period of a signal having a frequency within a second predetermined frequency range defined by a second predetermined lower frequency and a second predetermined upper frequency, said second detecting means comprising another means for counting pulses adapted to be coupled to the link to receive the signal from the link, said another counting means producing an output signal when the number of pulses received by it exceeds a third predetermined number within said first time period corresponding to said second predetermined lower frequency and is less than a fourth predetermined number within said second time period which is greater than the first time period corresponding to said second predetermined higher frequency, said second means for detecting comprising another further means coupled to the another counting means for receiving the output signal from the another counting means and providing another output signal when the number of output signals from the another counting means is greater than a predetermined number within said predetermined time period, said means for causing being coupled to said second detecting means to receive the output signal of said another further means and to said coil of said second latching relay.

11. The apparatus recited in claim 1 wherein said counting means receives said signal directly from the link.

12. The apparatus recited in claim 1 wherein said counting means receives said signal from the link indirectly through the switch means.

13. Apparatus adapted to be coupled to a link such as a telephone line and the like and to equipment to connected or disconnect the equipment from the link in response to a signal transmitted on the link from a location remote from the location at which the apparatus is located, the apparatus comprising:

switch means adapted to be coupled to the link and to the equipment so as to connect and disconnect the link and the equipment in respective switch states of the switch means;

means for detecting the presence for a predetermined minimum time period of a signal having a predetermined frequency characteristic and providing an output signal in response thereto, said means for detecting comprising means for producing a first signal when the frequency of said signal transmitted on the link is within a predetermined frequency range, said producing means generating successive pulses when said signal transmitted on the link stays within said frequency range for said minimum time period, and further comprising means for receiving said pulses and for providing a second signal when the number of pulses exceeds a predetermined number within said minimum time period;

means coupled to the detecting means to receive said second signal and cause the switch means to change state in response thereto for a predetermined time period; and said means for detecting and said means coupled to the detecting means being digital circuits which operate at a total current drain of less than about 100 ua.

14. The apparatus according to claim 13, wherein the current drain is less than about 50 ua.

15. The apparatus according to claim 13 and including a circuit for providing a regulated DC voltage to said means for detecting and said means coupled to the detecting means, said circuit comprising means adapted to be coupled to a DC voltage to be regulated having a reference input and an output for providing a regulated voltage proportional to the voltage at the reference input, at least one light-emitting diode coupled to the reference input, and means for supplying current to the light-emitting diode to maintain it forward biased, said means limiting the current supplied to the light-emitting diode to less than about 30 ua.

16. The apparatus according to claim 15 wherein said means for supplying current limits current to less than about 5 ua.

17. The apparatus according to claim 15 wherein said means for supplying current limits current to be in the range of about 0.5 ua to about 10 ua.

18. The apparatus according to claim 15 wherein said means for supplying current comprises a resistor adapted to be coupled between the light-emitting diode and the DC voltage to be regulated.

19. The apparatus according to claim 15 wherein said means for providing comprises a semiconductor device.

* * * * *

UNITED STATES PATENT AND TRADEMARK OFFICE
CERTIFICATE OF CORRECTION

PATENT NO. : 4,550,225

DATED : October 29, 1985

INVENTOR(S) : Daniel Lynch; Steven B. Perry

It is certified that error appears in the above-identified patent and that said Letters Patent is hereby corrected as shown below:

Col. 1, line 28, change "Sqme" to --Some--.

Col. 3, line 34, change "a" to --an--.

Col. 5, line 7, change "effect" to --effective--.

Col. 6, line 66, change "system" to --systems--.

Col. 7, line 32, change "an" to --and--.

Col. 9, line 42, change "second" to --seconds--.

Col. 10, line 15, change "light-emitted" to --light-emitting--.

Col. 12, line 31, change "or" to --of--.

Col. 14, line 12, after "embodiment" and before "as", insert --is--.

Col. 14, line 32, change "circiuts" to --circuits--.

Col. 15, line 50, delete "a".

Col. 15, line 64, delete "period", first occurrence.

Col. 16, lines 54, 55, change "con-nected" to --con-nect--.

Signed and Sealed this

*Sixth* Day of *May 1986*

[SEAL]

*Attest:*

DONALD J. QUIGG

*Attesting Officer* *Commissioner of Patents and Trademarks*